United States Patent [19]

Schulz

[11] 4,177,701
[45] Dec. 11, 1979

[54] STEADY REST FOR USE IN APPARATUS FOR SUPPORTING AND PRECISION-TURNING OF LARGE ROTARY DEVICES

[75] Inventor: Siegfried Schulz, Rolling Meadows, Ill.

[73] Assignee: Dieter Christoph, Streamwood, Ill.; a part interest

[21] Appl. No.: 939,322

[22] Filed: Sep. 5, 1978

[51] Int. Cl.² .................... B23B 25/00; B23B 3/00; B23B 5/28
[52] U.S. Cl. ........................ 82/39; 82/2 R; 82/8
[58] Field of Search ............. 82/2.5, 2.7, 38, 38 A, 82/39, 8

[56] References Cited

U.S. PATENT DOCUMENTS

| | | | |
|---|---|---|---|
| 1,370,705 | 3/1921 | Norton | 82/39 |
| 3,034,631 | 7/1977 | Schulz | 82/2 R |

FOREIGN PATENT DOCUMENTS

| | | | |
|---|---|---|---|
| 405752 | 9/1943 | Italy | 82/39 |
| 44346 | 8/1927 | Norway | 82/39 |
| 22132 | of 1912 | United Kingdom | 82/38 R |

Primary Examiner—Harrison L. Hinson

[57] ABSTRACT

The subject invention relates to an improved steady rest for use in a portable heavy-duty apparatus for machining large rotary work pieces. The apparatus includes a heavy-duty portable base and a cutting assembly for cutting the large rotary work pieces. The steady rest includes a pedestal releasably secured to the base. A jaw support is mounted on the pedestal. A pair of C-shaped movable jaws is mounted on the jaw support positionable in a selected attitude for receiving the rotary work pieces. A bridge connects the upper ends of the jaws to form a complete circle around a portion of the large rotary work piece. A roller is mounted on each of the jaws for rotatably supporting the rotary work piece. A brake is mounted on the jaws for releasably holding the rotary work piece.

23 Claims, 8 Drawing Figures

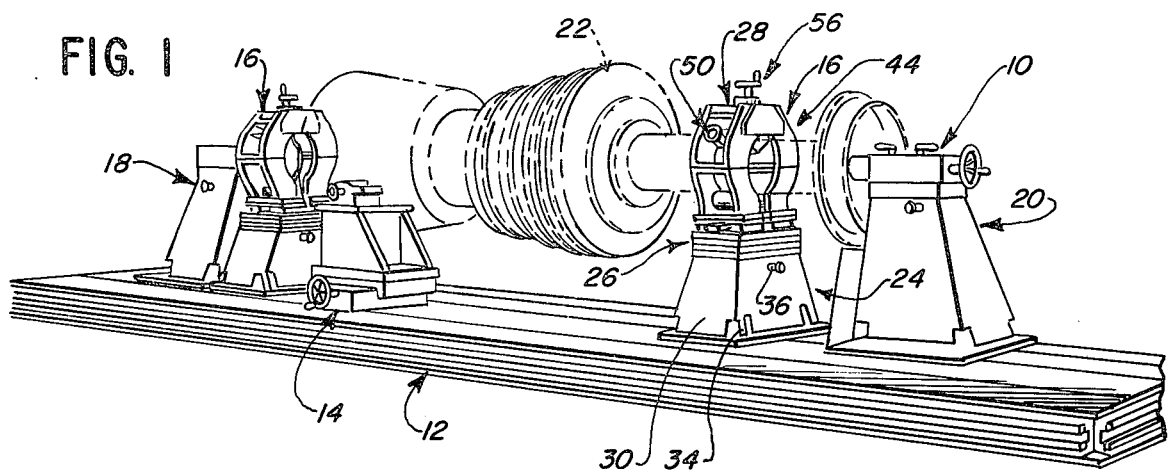
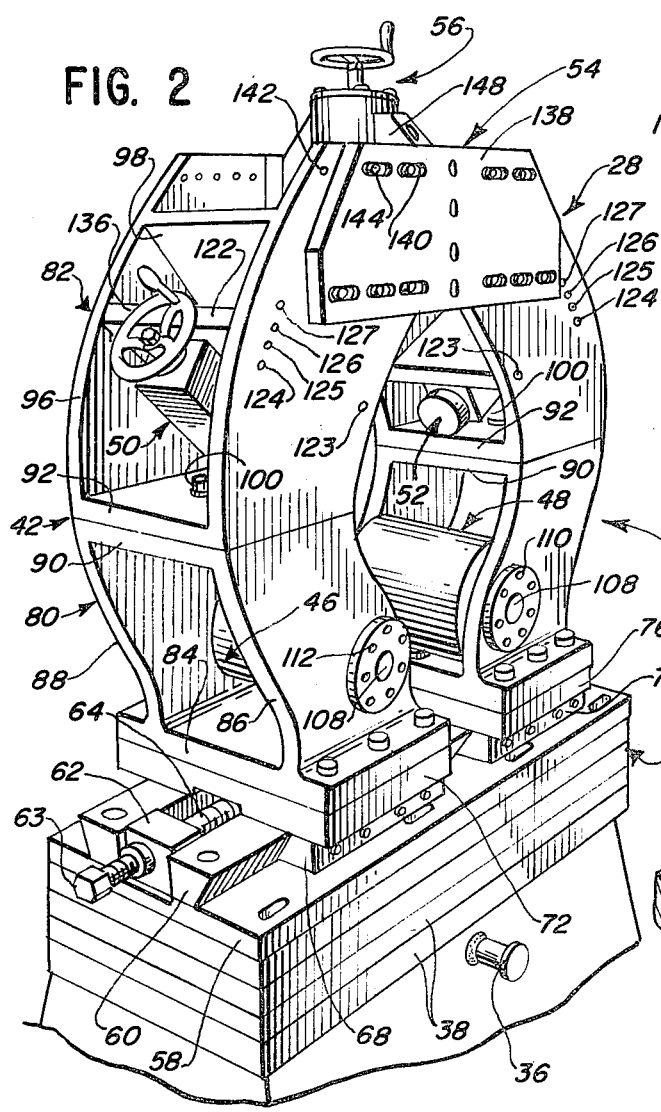
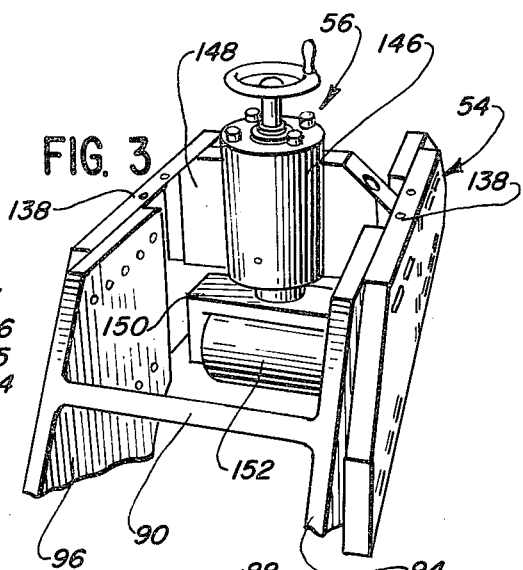
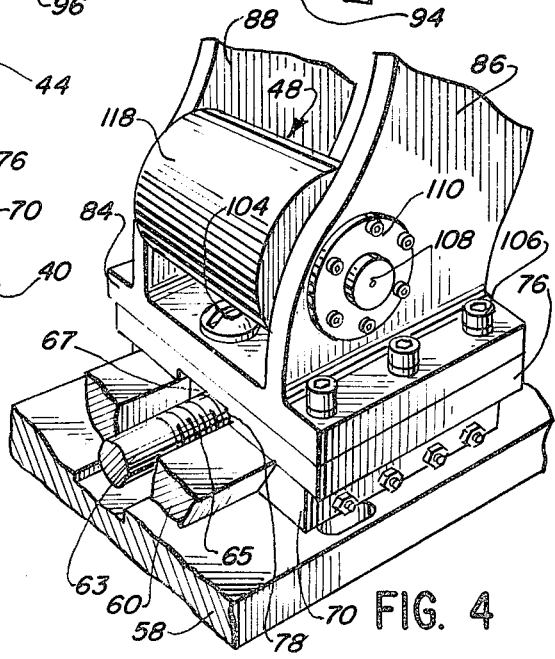

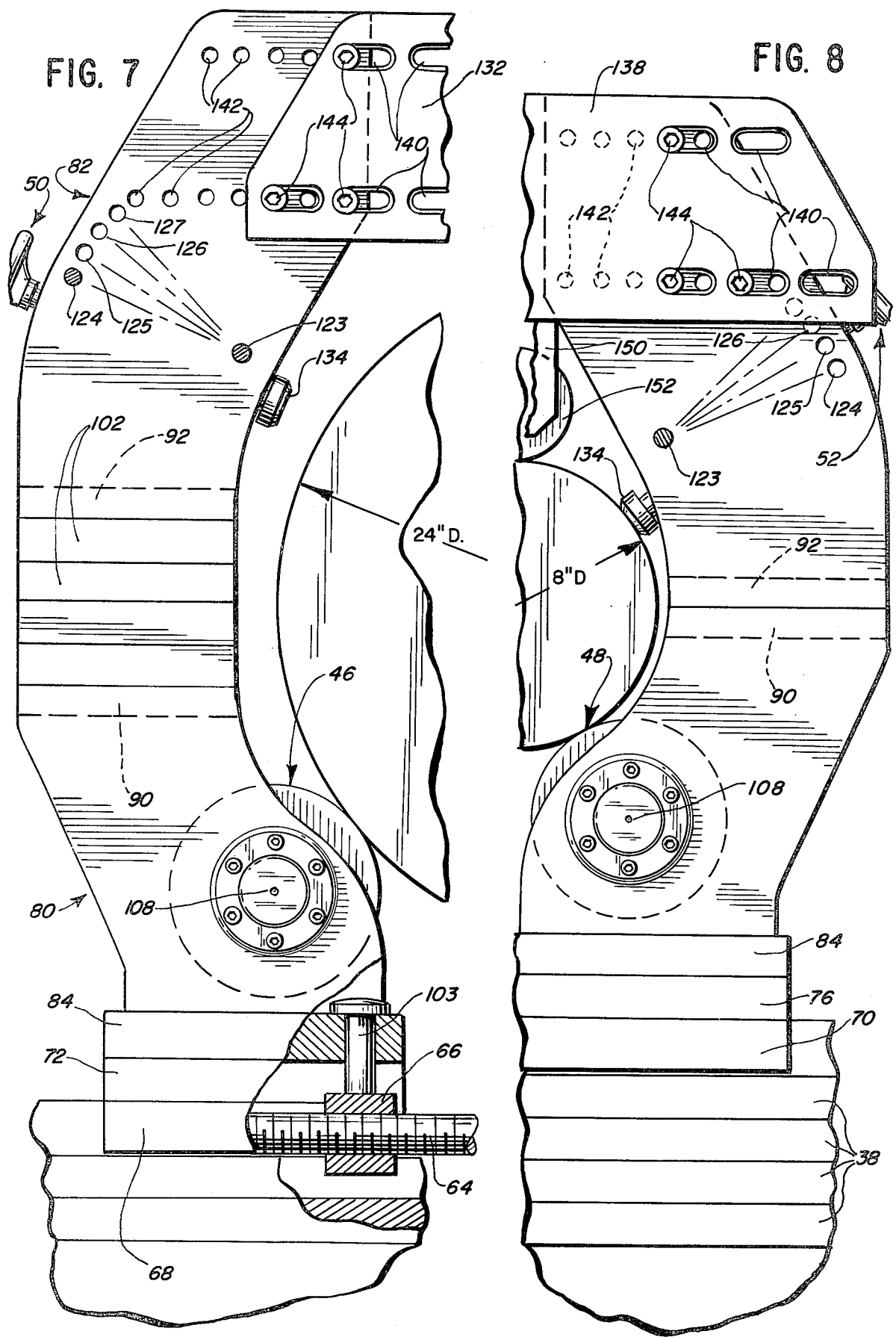

STEADY REST FOR USE IN APPARATUS FOR SUPPORTING AND PRECISION-TURNING OF LARGE ROTARY DEVICES

BACKGROUND OF THE INVENTION

Steam turbine electric generators, which are used in electric power-generating stations, are genrally of a substantial size. Ordinarily, the rotors of a turbine and a generator are mounted on a single shaft. The unit may weigh as much as 150 tons, and may be 35 feet long. When the steam turbine electric generators are in operation, they generally operate continuously, so that the shaft is constantly rotating. As is typical with any rotating mechanical device, it wears; and it is necessary to make repairs on the parts.

The size of the units ordinarily require that whatever repairs are to be made must be made at the power-generating station, rather than ship the units to a maintenance shop. One of the maintenance operations which must be performed on the shaft during an overhaul of the equipment is that the shaft must be turned, that is, the shaft must be shaved to make the shaft even. Accordingly, it is necessary to have a large turning device for supporting the shaft and turning it. One such device is disclosed in U.S. Pat. No. 4,034,631.

Although the turbine shaft weighs a substantial amount, it is necessary to turn the turbine shaft accurately and evenly. To this end, it is necessary to support the turbine shaft securely in a given attitude. This support of the turbine shaft is most important, so that machining of the shaft will be done with a high degree of precision.

SUMMARY OF THE INVENTION

The present invention relates to an apparatus for turning large heavy-weight rotary work pieces of various sizes, which apparatus is portable and may be easily set up. The apparatus generally includes a base. A cutter support is mounted on the base for holding a cutter in position adjacent to the work pieces. The specific improvement resides in a pair of improved steady rests mounted on the base for rotatably supporting the work piece. Each of the steady rests includes a pedestal releasably fixed to the base, and a vertical adjustment assembly for selectively determining the height of the steady rest. A jaw support is mounted on the vertical adjustment assembly. A pair of movable jaws is mounted on the jaw support; and the jaws are movable relative to each other to determine the space between the jaws. Each of the jaws includes an upper and a lower jaw. A plurality of removable extension plates is positionable between the upper and lower jaws for determining the height of the respective movable jaw. A support roller is rotatably mounted on the lower portion of each of the movable jaws for rotatably supporting the work piece. A removable bridge extends between upper portions of the movable jaws for stabilizing the jaws. An angularly adjustable brake is mounted on the upper portion of each movable jaw for selectively holding the work piece against rotation. A stabilizing roller is rotatably mounted on the bridge and vertically positionable to engage the work piece for holding the work piece in secure engagement with the support rollers.

BRIEF DESCRIPTION OF THE DRAWINGS

FIG. 1 is a perspective view of a portable apparatus for supporing and turning a large rotatable work piece, including two steady rests embodying the present invention, with a conventional turbine generator rotor shaft shown mounted on the steady rests, the turbine generator rotor shaft being shown in dotted form;

FIG. 2 is a perspective view of a head of one of the steady rests;

FIG. 3 is a fragmentary perspective view of a portion of a bridge and stabilizer of the head of FIG. 2;

FIG. 4 is a perspective view of a fragmentary portion of the head of FIG. 2, showing a support roller and a portion of a jaw support;

FIG. 7 is a side elevational view of a jaw, shown in an extended position, with a portion of a 24-inch diameter shaft shown mounted in engagement with a support roller rotatably mounted on the jaw; and FIG. 8 is a side elevational view similar to FIG. 7, but showing the jaw in its smallest attitude and showing a portion of a 10-inch diameter shaft mounted in engagement with a support roller rotatably mounted on the jaw.

DESCRIPTION OF THE PREFERRED EMBODIMENT

Figure 5:
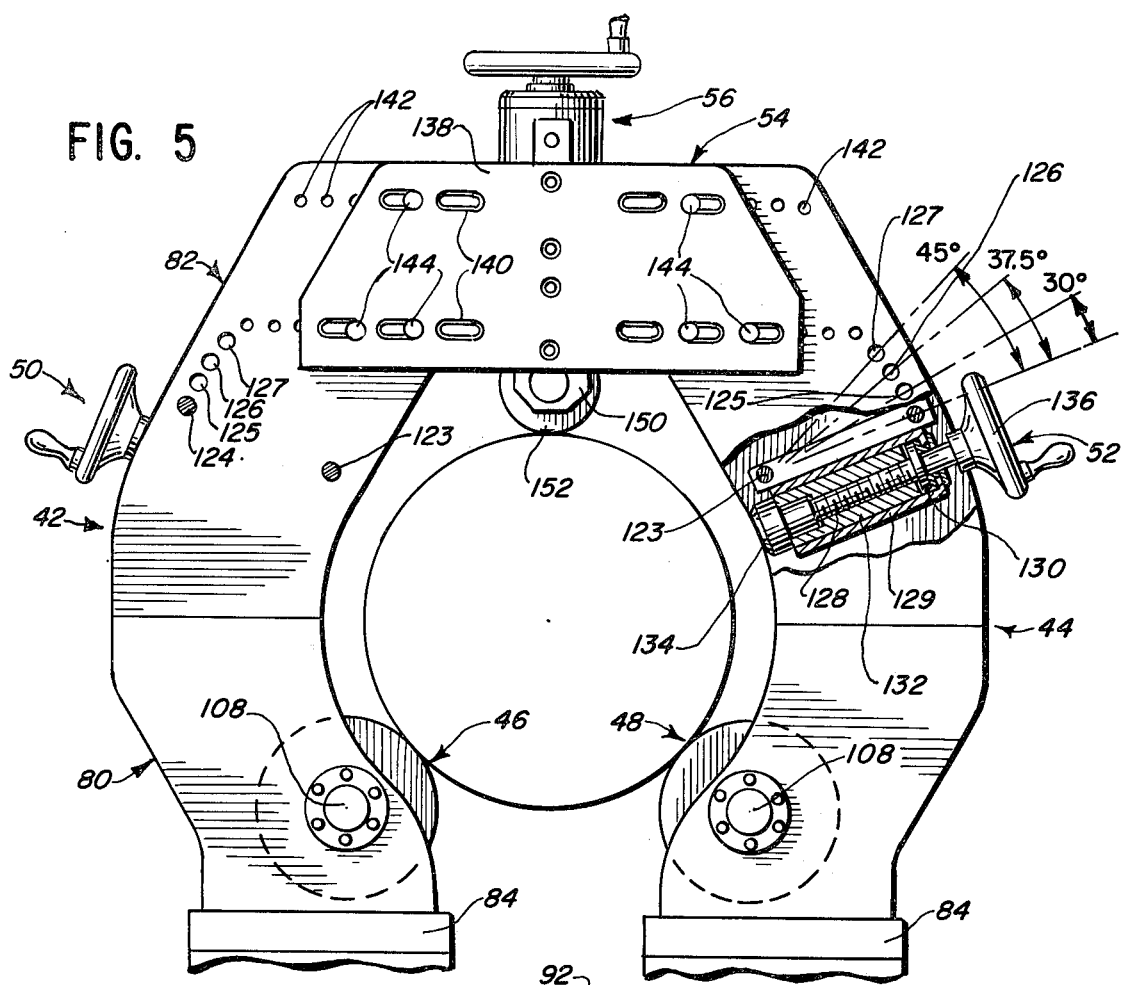
FIG. 5 is a side elevational view of a portion of the head of FIG. 2, with a portion of a jaw broken away, showing a brake in cross-section and indicating the angular positions at which the brake may be located.

Referring now to the drawings, and especially to FIG. 1, an apparatus for supporting and turning a large rotatable work piece is generally shown therein and is generally indicated by numeral 10. Apparatus 10 generally includes a portable base 12, a cutter assembly 14 removably mounted on the base, a pair of identical steady rests 16, which are a specific embodiment of the present invention, removably mounted on base 12, a dead center 18 removable mounted on the base in line with the steady rests, and a turning assembly 20 removably mounted on the base in line with the steady rests and the dead center. A turbine generator rotor shaft 22, shown in dotted form, is mounted in steady rests 16, with one end connected to turning assembly 20 and the cutter assembly 14 mounted on the base adjacent to the shaft.

A specific description of the base and cutter assembly, and the operation of apparatus 10, is set forth in detail in U.S. Pat. No. 4,034,631 and is well-known in the art.

Each steady rest 16 generally consists of a pedestal 24, a vertical adjustment assembly 26 mounted on the pedestal 24, and a head 28 mounted on the vertical adjustment assembly 26.

Pedestal 24 includes a four-sided pyramidical tower 30, with a mounting flange 32 fixed to the tower. A plurality of fasteners 34 removably secure the pedestal to base 12 at a selected position. The tower has a pair of lifting ears 36 fixed to opposite sides near the upper end thereof to provide a convenient means for attaching an appropriate device (such as a chain or cable) for lifting and transporting the pedestal to a selected location by means of a crane or other suitable apparatus.

Vertical adjustment assembly 26 generally consists of a plurality of flat metal plates 38, which are mounted on the top of tower 30. The plates are held together and secured to the top of the tower by suitable conventional fasteners, which are not shown herein.

Head 28, which is mounted on the vertical adjustment assembly, generally consists of a jaw support 40, a pair of movable jaws 42 and 44 mounted on the jaw support 40 for movement on the jaw support, a pair of support rollers 46 and 48 rotatably mounted on jaws 42 and 44, respectively, a pair of work piece brakes 50 and 52 mounted on jaws 42 and 44, respectively, a jaw bridge 54 connecting the upper portion of jaws 42 and 44, and a shaft stabilizer 56 mounted on the jaw bridge.

Jaw support 40 includes a pedestal plate 58, which is releasably secured to the vertical adjustment assembly by a plurality of conventional fasteners. A split dovetail way 60 is fixed to the pedestal plate 58. A pair of screw blocks 62 is mounted on opposite ends of way 60. A lead screw 63 is positioned in the middle of way 60 and is rotatably mounted in the screw blocks. The lead screw has a right-hand thread 64 on one portion and a left-hand thread 65 on an opposite and equal portion. A pivot nut 66 is threadedly mounted on right-hand thread 64; and a pivot nut 67 is threadedly mounted on left-hand thread 65 of the lead screw. A first pair of lock bars 68 engages a portion of way 60 adjacent to that portion of the lead screw which has a right-hand thread 64; and a second pair of lock bars 70 engages that portion of way 60 adjacent to that portion of the lead screw which has left-hand thread 65. A jaw base 72 is fixed to, and supported by, bars 68. Jaw base 72 includes a pivot nut groove 74, which slidably receives pivot nut 66 to prevent the nut from rotating but, rather, travel along the lead screw when the lead screw is rotated. A second jaw base 76 is fixed to, and supported by, bars 70. Jaw base 76 includes a pivot nut groove 78, which slidably receives pivot nut 67 to prevent the pivot nut 67 from rotating but, rather, travel along lead screw 63 in a direction opposite to pivot nut 66 when the lead screw is rotated.

Movable jaws 42 and 44 are identical to each other. Accordingly, movable jaw 42 will be described in detail herein. However, like parts of jaw 44 will be referred to by the same numbers as for jaw 42. Jaw 42 generally includes a lower jaw 80 and an upper jaw 82.

Lower jaw 80 includes a base plate 84, which is pivotally attached and releasably secured to jaw base 72 by a plurality of fasteners, as will be described hereinafter. A pair of roller plates 86 and 88 is fixed to base plate 84. The roller plates are perpendicular to the base plate. A connector plate 90 is fixed to the upper end of roller plates 86 and 88.

Upper jaw 82 includes an upper connector plate 92, which is adapted to engage connector plate 90. A pair of side plates 94 and 96 is fixed to the upper connector plate 92. An upper plate 98 is fixed to the upper connector plate 92. An upper plate 98 is fixed between the side plates 94 and 96. It may be seen from FIGS. 2, 5 and 8 that the movable jaws generally form a C-shape. Movable jaws 42 and 44 are mounted on the jaw support in an attitude with the open sides of each jaw facing each other and forming a work piece opening therebetween.

Upper jaw 82 is secured to the lower jaw 80 by a mechanical fastener 100, which connects connector plate 90 with the upper connector plate 92. In FIG. 7, it may be seen how jaw 42 may be extended to receive a large-diameter work piece. Four extension plates 102 are positioned between connector plate 90 and upper connector plate 92 to extend the height of the jaw, thereby accommodating the jaw to a large work piece.

Jaw 42 is pivotedly connected to the jaw support through a pivot pin 103, which is fixed to pivot nut 66. In a like manner, jaw 44 is connected to the jaw support through a pivot pin 104, which is fixed to pivot nut 67. The base plates of the respective movable jaws 42 and 44 pivotedly engage the respective pivot pins 103 and 104, so that the movable jaws may be positioned relative to a work piece. After jaws are appropriately positioned, fasteners 106 releasably fix the base plates of the jaws to the jaw bases of the jaw support.

Figure 6:
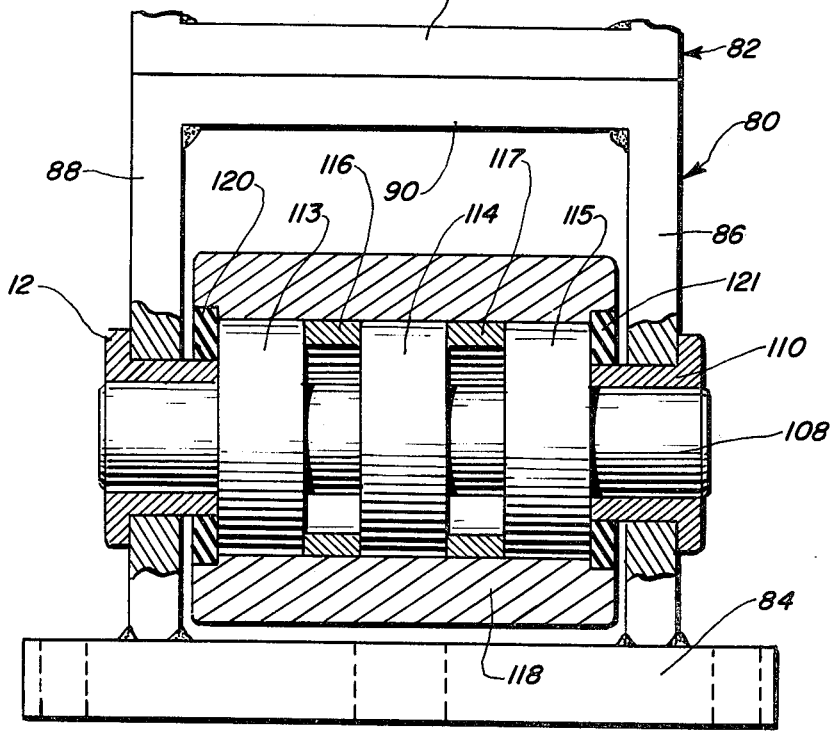
FIG. 6 is a cross-sectional view through a portion of a jaw of the head, showing in cross section a support roller mounted on the jaw.

The rollers 46 and 48 are identical in their construction. Roller 48 is described in detail. Roller 48, which is shown in FIG. 6, includes a roller shaft 108. The roller shaft is rotatably supported in bearings 110 and 112, which bearings are mounted in roller plates 86 and 88, respectively. The roller also includes three conventional roller bearings 113, 114 and 115, mounted on shaft 108. A spacer 116 is positioned between bearings 113 and 114; and another spacer 117 is positioned between bearings 114 and 115. A roller cylinder 118 is mounted on the outside of the bearings 113, 114 and 115 for engaging a work piece. A pair of seals 120 and 121, positioned adjacent to bearings 113 and 115, respectively, encloses the ends of cylinder 118.

Brakes 50 and 52 are identical to their construction; and brake 52 is described in detail herein. Brake 52 includes a brake plate 122, which is connected to a brake pivot pin 123 and is thereby pivotedly mounted on upper jaw 82 between the side plates 94 and 96. Side plates 94 and 96 contain four brake plate locking apertures 124, 125, 126 and 127, so that the brake plate may be angularly adjusted by securing one end of the brake plate at a selected aperture. The angular position of the brake is determined by brake plate locking apertures 124, 125, 126 and 127; and is 22.5°, 30°, 37.5° and 45°, respectively, from the horizontal. A brake housing 128 is secured to brake plate 122. The housing has a brake screw 129 rotatably mounted therein, which brake screw has a brake screw collar 130 secued thereto in rotatable engagement with the housing and thereby retainingly holding the brake screw. An elongated brake nut 132 is threadedly mounted on the brake screw. The brake nut has a brake pad 134 mounted on the end of the nut. A conventional wheel 136 is fixed to the brake screw to provide a convenient means for turning the screw for extension or retraction of the brake pad 134 for selective engagement with the work piece for selectively holding the work piece against rotation.

Jaw bridge 54 includes a pair of bridge plates 138, each having a plurality of horizontal slots 140 in the plates. Side plates 94 and 96 of upper jaws 82 have a plurality of threaded apertures 142 contained therein for selective alignment with slots 140. After the jaws have been appropriately spaced, the bridge plates 138 are placed into position and a plurality of fasteners 144 is positioned in selected apertures 142, which align with the slots 140 to secure the jaw bridge to the upper portion of the movable jaws and provide support therebetween.

Shaft stabilizer 56 is mounted on the jaw bridge 54. The shaft stabilizer includes a stabilizer cylinder 146, which has a pair of web plates 148 fixed thereto, which web plates are in turn fixed to the bridge plates 138, as may be best seen in FIG. 3. The shaft stabilizer construction is similar to the brake construction in that it includes a screw and nut arrangement. A yoke 150 replaces the brake pad, so that the yoke may be moved relative to the cylinder. The yoke has a stabilizer roller 152 rotatably mounted therein, which stabilizer roller is engageable with a work piece mounted on the support roller between the movable jaws.

The apparatus is used for servicing turbine and generator rotors fixed to a shaft, hereinafter referred to as the rotor assembly. The shaft size may be as small as 6 inches in diameter and as large as 24 inches in diameter. The total weight may be as great as 150 tons. When the rotor assembly in a steam electric generating system is serviced, the apparatus for servicing the rotor assembly is moved into the generating station. Base 12 is located, as are the various other parts, such as, the cutting assembly, the dead center, and the turning assembly. Power-generating stations usually have a crane with a capacity to handle the rotor assembly. This crane is used to assemble apparatus 10. Steady rests 16 are positioned in alignment with the dead center and the turning assembly. The crane is attached to ears 36 to lift the pedestal into a proper location. The pedestal is placed in proper alignment to receive the rotor assembly.

Steady rests 16 may be used for a wide variety of sizes of shafts. In the present embodiment, shaft sizes varying from 6 inches to 24 inches in diameter may be accommodated. With a shaft of a given diameter, the vertical adjustment assembly 26 is placed on the pedestal. A selected number of flat plates 38 is positioned on the pedestal, so that the proper height is achieved. The jaw support 40 is mounted on the vertical adjustment assembly and is secured thereto. The jaws 42 and 44 are assembled to their proper size for a given size diameter rotor shaft. For the small size shaft, no extension plates 102 are positioned between the connector plate 90 and the upper connector plate 92. Extension plates in sufficient number are positioned between the upper and lower jaws to adapt the jaw to a proper size for a given rotor shaft. Once the height of the jaws is selected and the jaws are in a proper position and the steady rest is in proper position, the steady rest is ready to receive the motor shaft. The rotor shaft is lifted by a crane and moved into position above the steady rest. The rotor is lowered and is aligned with the dead center so that there is perfect alignment. The pedestal of the steady rest is then moved on the base to a proper position for the rotor shaft. The steady rest is then secured to the base by means of fastener 34. Jaws 42 and 44 of the steady rest are moved toward each other until support rollers 48 engage the rotor shaft. Inasmuch as the jaws are pivotal on the jaw support, as the support rollers engage the rotor shaft, the jaws pivot slightly in order to accommodate the support rollers to the shaft, so that support rollers 48 are aligned parallel to the rotor shaft. The base plate of each lower jaw is then secured to its respective jaw base of the jaw support by a plurality of fasteners. The bridge plates 138 are then placed into position to secure the upper end of the jaws; and the rotor shaft is now supported by steady rests 16. The stabilizer is operated to place stabilizer roller 152 into engagement with the uppermost portion of the rotor shaft. It should be noted that the stabilizer roller is positioned midway between rollers 48. The rotor shaft then may be turned in order to cut the rotor shaft by means of the cutter assembly.

During certain operations, it is necessary to hold the rotor shaft against rotation. The brakes 50 and 52 are used to prevent the rotor shaft from rotating. As was pointed out above, the brakes may be adjusted by appropriate positioning of the brake plate 122. Brake plate 122 is pivoted about pivot 123; and the brake plate is secured by a fastener in one of the brake plate locking apertures, so that the travel of the brake pad 134 is in a direction which is substantially radial to the rotor shaft or work piece which is between the movable jaws. Wheel 136 of each brake is turned to extend brake pad 134 of each brake into engagement with the rotor shaft and thereby frictionally hold the rotor shaft against rotation.

After the work is completed, the crane is again secured to the rotor shaft. Bridge plates 138 are removed; and the rotor shaft is lifted slightly to relieve the load on the jaw support. The jaws are then spread apart; and the rotor is lifted and moved back into its operative position. The assembly is then disassembled and moved to another location, where work is done on another rotor shaft and usually a rotor shaft of a different diameter.

Although a specific embodiment of the present invention has been shown and described in detail herein, it is to be expressly understood that the instant invention is limited only by the appended claims.

I claim:

1. In an apparatus for supporting and turning a large rotatable work piece, said apparatus having a base, a cutter support mounted on the base for holding the cutter in position adjacent to the work piece, the improvement comprising: a pair of steady rests mounted on said base for rotatably supporting the work piece; each of said steady rests including; a pedestal releasably secured to the base and being adjustably positioned on the base, a jaw support mounted on the upper portion of the pedestal, a pair of movable jaws movably mounted on the jaw support positioned in a substantially upright attitude for receiving the work piece therebetween, each of the jaws having a lower portion connected to the jaw support and and an upper portion spaced from the upper portion of its opposite jaw, said jaws being movable relative to each other on the jaw support to accept work pieces of different sizes, a support roller rotatably mounted on the lower portion of each of the jaws for engaging and rotatably supporting the work piece, and a bridge extending between the upper portions of the jaws and being releasably connected to said upper portions for stabilizing the jaws and forming a complete circle around the work piece in cooperation with the respective pair of jaws and the respective jaw support.

2. In an apparatus for supporting and turning a large rotatable work piece as defined in claim 1 wherein each of the movable jaws is pivotedly connected to the jaw support to allow alignment of the rollers into a parallel relationship with the work piece.

3. In an apparatus for supporting and turning a large rotatable work piece as defined in claim 1, including a brake mounted on a movable jaw selectively engageable with the work piece to prevent selectively the work piece from rotating on the support rollers.

4. In an apparatus for supporting and turning a large rotatable work piece as defined in claim 1, including a stabilizing roller mounted on the bridge positioned between the support rollers and rotatably engageable with the work piece to hold the work piece in secure engagement with the support rollers supporting the work piece.

5. In an apparatus for supporting and turning a large rotatable work piece as defined in claim 1 wherein each of said movable jaws is C-shaped, each of the C-shaped jaws is positioned in an attitude with the open side of each jaw facing the other respective jaw of the pair to form an opening to receive the work piece therein.

6. In an apparatus for supporting and turning a large rotatable work piece as defined in claim 1 wherein each of the movable jaws includes an upper jaw and a lower jaw, plurality of removable extension plates secured between the upper and lower jaws for determining the height of each of the movable jaws to receive a work piece of a given diameter between the movable jaws.

7. In an apparatus for supporting and turning a large rotatable work piece as defined in claim 1 wherein each of the movable jaws includes an upper jaw and a lower jaw, a plurality of removable extension plates secured between the upper and lower jaws for determining the height of the respective movable jaw to receive a work piece of a given diameter between the movable jaws, each of the lower jaws being pivotedly connected to the jaw support to allow alignment of the support rollers into a parallel relationship with the work piece, a brake mounted on each of the upper jaws selectively engageable with the work piece to prevent selectively the work piece from rotating on the support rollers, said brake being pivotedly connected to the upper jaw for selectively positioning the brake to engage the work piece in a substantially radial direction to the work piece, and a stabilizing roller mounted on the bridge, said stabilizing roller being movably connected to the bridge for vertical adjustment of the stabilizing roller for rotatable engagement with the work piece to hold the work piece in secure engagement with the support rollers supporting the work piece.

8. In an apparatus for supporting and turning a large rotatable work piece as defined in claim 1 wherein each of the movable jaws is pivotedly connected on the jaw support to allow alignment of the support rollers into a parallel relationship with the work piece, and including a brake mounted on each jaw selectively engageable with the work piece to prevent selectively the work piece from rotating on the support rollers.

9. In an apparatus for supporting and turning a large rotatable work piece as defined in claim 1 wherein each of the movable jaws includes an upper and a lower jaw, a plurality of removable extension plates secured between the upper and lower jaws for determining the height of the respective movable jaw to receive a work piece of a given diameter between the movable jaws, each of the lower jaws being pivotedly connected to the jaw support to allow alignment of the support rollers into a parallel relationship with the work piece.

10. In an apparatus for supporting and turning a large rotatable work piece as defined in claim 1 wherein each of the movable jaws includes an upper jaw and a lower jaw, a plurality of removable extension plates secured between the upper and lower jaws for determining the height of the respective movable jaw to receive a work piece of a given diameter between the movable jaws, each of the movable jaws being pivotedly connected to the jaw support to allow alignment of the support rollers into parallel relationship with the work piece, and a brake mounted on each of the upper jaws selectively engageable with the work piece to prevent selectively the work piece from rotating on the support rollers.

11. In an apparatus for supporting and turning a large rotatable work piece as defined in claim 1 wherein each of the movable jaws is pivotedly connected to the jaw support to allow alignment of the support rollers into parallel relationship with the work piece, and including a brake mounted on each movable jaw selectively engageable with the work piece to prevent selectively the work piece from rotating on the support rollers, and a stabilizing roller mounted on the bridge and being vertically adjustable relative to the bridge for rotatable engagement with the work piece to hold the work piece in secure engagement with the support rollers supporting the work piece.

12. In an apparatus for supporting and turning a large rotatable work piece as defined in claim 1 wherein each of the movable jaws includes an upper jaw and a lower jaw, a plurality of removable extension plates secured between the upper and lower jaws for determining the height of the respective movable jaw to receive a work piece of a given diameter between the movable jaws, each of the lower jaws being pivotedly connected to the jaw support to allow alignment of the support rollers into parallel relationship with the work piece, and a stabilizing roller mounted on the bridge and being vertically adjustable for rotatable engagement with the work piece to hold the work piece in secure engagement with the support rollers supporting the work piece.

13. In an apparatus for supporting and turning a large rotatable work piece as defined in claim 1, including a stabilizing roller mounted on the bridge and rotatably engageable with the work piece to hold the work piece in secure engagement with the support rollers supporting the work piece, each of the movable jaws being pivotedly connected to the jaw support to allow alignment of the support rollers into a parallel relationship with the work piece.

14. In an apparatus for supporting and turning a large rotatable work piece as defined in claim 1 wherein each of said movable jaws is C-shaped, each of the C-shaped jaws is positioned in an attitude with the open side of each jaw facing the other respective jaw of the pair to form an opening to receive the work piece therein, each of the movable jaws being pivotedly connected to the jaw support to allow alignment of the support rollers into a parallel relationship with the work piece.

15. In an apparatus for supporting and turning a large rotatable work piece as defined in claim 1, including a brake mounted on each movable jaw selectively engageable with the work piece to prevent selectively the work piece from rotating on the support rollers, and a stabilizing roller mounted on the bridge between the brakes, said stabilizing roller rotatably engageable with the work piece to hold the work piece in secure engagement with the support rollers supporting the work piece.

16. In an apparatus for supporting and turning a large rotatable work piece as defined in claim 1 wherein each of said movable jaws is C-shaped, each of the C-shaped jaws being positioned in an attitude with the open side of each jaw facing the other respective jaw of the pair, and a brake mounted on the upper portion of each movable jaw selectively engageable with the work piece to prevent selectively the work piece from rotating on the support rollers.

17. In an apparatus for supporting and turning a large rotatable work piece as defined in claim 1 wherein each of the movable jaws includes an upper jaw and a lower jaw, a plurality of removable extension plates secured between the upper and lower jaws for determining the height of the respective movable jaw to receive a work piece of a given diameter between the movable jaws, and including an angularly adjustable brake mounted in the upper jaw of each movable jaw selectively engageable with the work piece to prevent selectively the work piece from rotating on the support rollers, and a stabilizing roller mounted on the bridge and rotatably engageable with the work piece to hold the work piece in secure engagement with the support rollers supporting the work piece.

18. In an apparatus for supporting and turning a large rotatable work piece as defined in claim 1 wherein each of the movable jaws includes an upper jaw and a lower jaw, a plurality of removable extension plates secured between respective upper and lower jaws for determining the height of the respective movable jaw to receive a work piece of a given diameter between the movable jaws, and a brake mounted on each of the upper jaws selectively engageable with the work piece to prevent selectively the work piece from rotating on the support rollers.

19. In an apparatus for supporting and turning a large rotatable work piece as defined in claim 1 wherein each of said movable jaws is C-shaped, each of the C-shaped jaws being positioned in an attitude with the open side of each jaw facing the other respective jaw of each pair, each of the movable jaws including an upper jaw and a lower jaw, and a plurality of extension plates secured between the upper and lower jaws for determining the height of each movable jaw to receive a work piece of a given diameter between the movable jaws.

20. In an apparatus for supporting and turning a large rotatable work piece as defined in claim 1 wherein each of the movable jaws includes an upper and a lower jaw, a plurality of removable extension plates secured between the upper and lower jaws for determining the height of the respective movable jaw to receive a work piece of a given diameter between the movable jaws, and including a stabilizing roller mounted on the bridge and rotatably engageable with the work piece to hold the work piece in secure engagement with the support rollers supporting the work piece.

21. In an apparatus for supporting and turning a large rotatable work piece as defined in claim 1 wherein each of said movable jaws is C-shaped, each of the C-shaped jaws being positioned in an attitude with the open side of each jaw facing the other respective jaw of each pair, and a stabilizing roller mounted on the bridge and rotatably engageable with the work piece to hold the work piece in secure engagement with the support rollers supporting the work piece.

22. In an apparatus for supporting and turning a large rotatable work piece as defined in claim 1 wherein each of the movable jaws is pivotedly connected to the jaw support to allow alignment of the support rollers into a parallel relationship with the work piece, fasteners releasably fixing each of the movable jaws to the jaw support, each of said movable jaws being C-shaped and being positioned in an attitude with the open side of the jaw facing the other respective jaw, each of the movable jaws including an upper jaw and a lower jaw, a plurality of removable extension plates secured between the upper and lower jaws for determining the height of each of the movable jaws to receive a work piece of a given diameter between the movable jaws, a brake mounted on each of the upper jaws selectively engageable with the work piece to prevent selectively the work piece from rotating on the support rollers, each of said brakes being pivotedly mounted on its respective upper jaw and being secured in a selected position to place the brake in substantial radial alignment with the respective work piece, and a stabilizing roller mounted on the bridge and rotatably engageable with the work piece to hold the work piece in secure engagement with the support rollers supporting the work piece.

23. In an apparatus for supporting and turning a large rotatable work piece, said apparatus having a base, a cutter support mounted on the base for holding a cutter in position adjacent to the work piece, the improvement comprising: a pair of steady rests mounted on said base for rotatably supporting the work piece; each of said steady rests including; a pedestal having a tower mounted on the base; fasteners releasably securing the tower to the base; a plurality of adjustment plates mounted on the pedestal; a jaw support mounted on the adjustment plates, said jaw support including a pedestal plate, a lead screw rotatably mounted on the pedestal plate, a pair of pivot nuts threaded on the lead screw, and a jaw base connected to each of the pivot nuts and movable therewith; a C-shaped jaw mounted on each jaw base, each C-shaped jaw positioned in a substantially upright attitude with the open side of each jaw facing the other jaw to form a work piece opening therebetween for receiving the work piece, each of the C-shaped jaws having an upper jaw and a lower jaw, each lower jaw having a base plate connected to the jaw base, a pair of roller plates fixed to the base plate, and a connector plate forming the upper end of the lower jaw fixed to the roller plates, a plurality of removable extension plates secured to the connector plate of the lower jaw for determining the size of the C-shaped jaw, said upper jaw having an upper jaw connector plate connected to the extension plates, a pair of side plates fixed to the connector plate, and an upper plate fixed to the side plates adjacent to the upper end of the upper jaw; a removable jaw bridge connecting the upper jaws to complete a circle around a work piece in cooperation with the C-shaped jaws and the jaw support; a support roller mounted in each lower jaw between the roller plates and being adpated to rotatably engage the work piece; a brake mounted in each upper jaw, each brake including a brake plate pivotedly mounted between the side plates of the respective upper jaw for angularly positioning the brake, a brake housing secured to the brake plate, a brake screw rotatably mounted in the brake housing, a brake nut threadedly engaging the brake screw and a brake pad mounted on the brake nut for engagement with the work piece; and a shaft stabilizer mounted on the removable jaw bridge, said shaft stabilizer including a stabilizer roller being vertically adjustable for engagement with the work piece to hold the work piece in engagement with the support rollers supporting the work piece.

* * * * *

UNITED STATES PATENT OFFICE
CERTIFICATE OF CORRECTION

PATENT NO. : 4,177,701
DATED : December 11, 1979
INVENTOR(S) : Siegfried Schulz

It is certified that error appears in the above-identified patent and that said Letters Patent are hereby corrected as shown below:

Column 5, line 43 "motor" should be -- rotor --.

Column 7, line 10, after "jaw" insert -- a --.

Under "REFERENCES CITED U.S. PATENT DOCUMENTS"

"3,034,631 7/1977 Schulz" should be -- 4,034,631 7/1977 Schulz --.

Signed and Sealed this

First Day of April 1980

[SEAL]

Attest:

SIDNEY A. DIAMOND

Attesting Officer

Commissioner of Patents and Trademarks